June 23, 1953 J. M. DE STADELHOFEN ET AL 2,643,300

TELEPHONE SUBSCRIBER SET WITH SIDE-TONE REDUCTION FOR CENTRAL BATTERY SYSTEMS

Filed June 17, 1948 3 Sheets-Sheet 1

INVENTORS:

JEAN MEYER DE STADELHOFEN

JOSEPH MÜLLER-STROBEL

JEAN PATRY

RICHARD STRUB

BY C. M. Avery ATT'Y

June 23, 1953 J. M. DE STADELHOFEN ET AL 2,643,300

TELEPHONE SUBSCRIBER SET WITH SIDE-TONE REDUCTION FOR CENTRAL BATTERY SYSTEMS

Filed June 17, 1948 3 Sheets-Sheet 2

INVENTORS:
JEAN MEYER DE STADELHOFEN
JOSEPH MÜLLER-STROBEL
JEAN PATRY
RICHARD STRUB

BY ATT'Y

INVENTORS:
JEAN MEYER DE STADELHOFEN
JOSEPH MÜLLER-STROBEL
JEAN PATRY
RICHARD STRUB

BY C. M. Avery
ATT'Y

Patented June 23, 1953

2,643,300

UNITED STATES PATENT OFFICE 2,643,300

TELEPHONE SUBSCRIBER SET WITH SIDE-TONE REDUCTION FOR CENTRAL BATTERY SYSTEMS

Jean Meyer de Stadelhofen, Bern, and Joseph Müller-Strobel, Jean Patry, and Richard Strub, Zurich, Switzerland, assignors to Albiswerk Zurich A. G., Zurich, Switzerland, a Swiss company Application June 17, 1948, Serial No. 33,524
In Switzerland November 4, 1947

7 Claims. (Cl. 179—81)

This invention relates to telephone substations with side tone reduction for central battery systems.

It is an object of the invention to provide a telephone substation which combines satisfactory side tone reduction with lower losses than heretofore obtainable and hence secures in side-tone reduced stations a higher alternating-current efficiency together with a satisfactory microphone direct-current excitation.

Another object of the invention, relating to telephone substation circuits with autotransformer windings for the receiver and the microphone, is to utilize these receiver and microphone windings as a means for reducing side tone so that the additional means needed for attaining the full degree of side-tone reduction can be given a lower ohmic resistance thus securing a smaller overall resistance of the substation circuit than otherwise possible.

It is also an object to provide a telephone substation for automatic exchanges which combines satisfactory side-tone reduction with freedom from high-frequency interference due to the operation of the dial pulse contactor.

Figure 1:
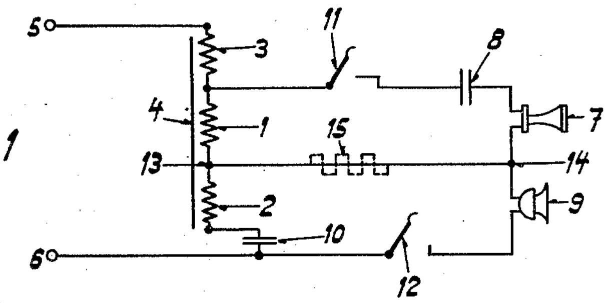
Figs. 1–3 show manual telephone subscriber set circuits.

Telephone substations according to the invention have an autotransformer with at least three series-connected windings wound in the same direction for adapting the microphone resistance to a predetermined substation impedance. A capacitor is series connected with the transformer windings. When the hand set is picked up, the receiver and another capacitor are series-connected with each other across a first one of the transformer windings, and the microphone is connected across the series connection of the first-mentioned capacitor with a second one of the transformer windings whose direct-current resistance is at least one-quarter of the corresponding resistance value of the first winding but not larger than that value. Under these conditions, the direct-current resistance of the first and second windings form together a substantial portion of the network resistance necessary for side-tone reduction, and it is possible to obtain full side-tone damping without additional series resistors and to give the remaining winding or windings of the transformer a very low ohmic resistance. As a result, the loss resistances, ineffective for side-tone reduction, remain small. The condition of side-tone reduction is represented, subject to ideal transformer qualities, by the following equation:

$$r_1\frac{1+b}{a}+r_2\cdot(a+b)=R_L$$

wherein $r_1$ and $r_2$ signify the direct-current resistances of the first and second winding respectively and $R_L$ the line wave resistance. $a$ designates the ratio $w_1 : w_2$ of the number of turns of the first and second windings and $b$ the ratio $w_3 : w_2$ of the number of turns of the third and second windings. As great a proportion as possible of the network resistance is preferably allotted to the first winding, as the direct-current resistance of the second winding reduces the transformer effect of this second winding and is therefore detrimental to the adaptation of the microphone. For this reason the direct-current resistance $r_1$ of the first winding should amount to at least 50Ω. On the other hand, care must be taken that the microphone feed current is not reduced to such an extent by the two resistances $r_1$ and $r_3$, which are in series with the line, that the sensitivity of the microphone is diminished. With a choke coil for speech-currents of low direct-current resistance connected in parallel to the first winding it is, however, possible to adjust the resistance $r_1$ to any desired level.

The windings of the above-mentioned autotransformer may also form an exciting coil of a polarised alternating current ringer. In certain cases a supplementary winding must be wound on the auto-transformer to complete the number of turns required for exciting the ringer.

The invention is particularly advantageous for automatic telephone systems because it permits a simplification of the interference elimination means in the substations. The dial contactor in such substations may produce high-frequency interference currents which appreciably interfere with wireless reception. It is therefore necessary to provide such telephone subscriber sets with means for interference elimination which, without impairing the low-frequency transformer qualities of the set and without causing inadmissible distortions of the dialling impulses, sufficiently and economically, limit the interference currents, if posible to such an extent that high-frequency communication over the telephone lines is not interfered with. It is also imperative that the input impedance of the set does not drop below a given minimum within the entire frequency range involved and in any operating condition of circuit if the telephone lines are used for superimposed high-frequency and low-frequency communication.

Referring to the just-mentioned automatic systems, and in accordance with another feature of the invention, the third winding of the auto-transformer is divided into two outer windings which are connected to the substation terminals so that the other transformer windings lie between the outer windings. A short-circuit connection is built up between the inner end points of the two outer windings by the off-normal contact of the dial contactor during dialling, and the pulse contact of the dial is arranged in the short-circuit connection so that the high-frequency interference voltages produced during operation of the pulse contact are at least partly deflected from the line by the inductances of the two outer windings. It is thus possible to keep the interference voltages arising during operation of the set so low that wireless reception is not interfered with. The impedance of such a set is also suitable for high-frequency operation over the telephone lines, although such an operation also requires that special interference-elimination measures be taken.

One means of ensuring complete elimination of interference consists in the connection of two additional high-frequency choke coils between the two outer transformer windings and the respective line terminals. In certain cases the auto-transformer windings may be bridged by an additional capacitor, so that the circuit, viewed both from inside and outside, corresponds to a symmetrical low-pass filter.

Another possibility for the complete elimination of interference in the set is afforded by:

(1) The arrangement of an additional high-frequency choke coil in the off-normal built up by the shorting circuit contact of the dial, so that the coil is connected in series to the pulse contact, (2) The connection of additional circuit elements to the dial contactor which form a capacitive anti-interference circuit between the inner end points of the two outer transformer windings before the short-circuit connection is built up, so that due to the co-operation of the high-frequency choke coil and the capacitive anti-interference circuit practically no high-frequency interference currents are set up when dialling.

Figure 2:
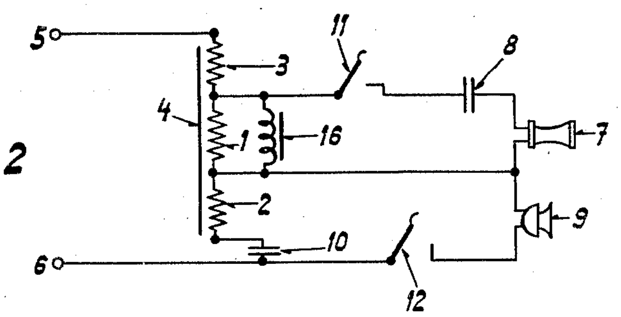
Figure 3:
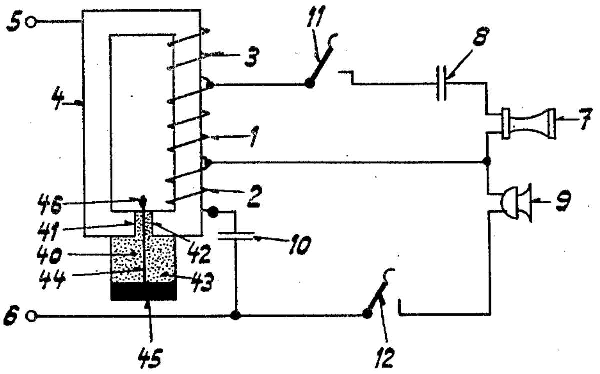

Various embodiments of the invention are explained in greater detail below, with reference to the drawing. Figs. 1–3 show three respective telephone subscriber sets without equipment for automatic dialling. Fig. 3 shows diagrammatically a set whose auto-transformer windings serve also as the exciting coil of an alternating current ringer. Figs 4–9 show different telephone subscriber sets with equipment for automatic dialling and special anti-interference precautions. In all figures, corresponding elements are provided with the same respective reference numerals to facilitate comparing the various figures. 1, 2 and 3 designate the three unidirectionally-wound windings of the auto-transformer and 4 its iron core. (With the exception of Fig. 3 this iron core is only diagrammatically indicated in the figures). In all figures, 5 and 6 designate the line terminals of the set, 7 the receiver and 8 the capacitor connected in series thereto, 9 the microphone and 10 the capacitor connected in series to the winding 2. All wiring diagrams shown correspond to a telephone subscriber set open for incoming calls. When the microphone is picked up, receiver 7 and capacitor 8 are series-connected by a fork or hook contact 11 across the first winding 1. Either simultaneously therewith, or for avoiding crackling in the receiver, shortly earlier, the series circuit of winding 2 and capacitor 10 is connected in parallel to the microphone 9 by the fork or hook contact 12. The set is now alive. The microphone feed current flows from the line terminal 5 through windings 3 and 1 to the microphone 9 and thence to the line terminal 6. The direct current resistances $r_1$ and $r_2$ of respective windings 1 and 2 are so chosen, allowing for the proper turn ratios, that they meet the requirement specified above. In certain circumstances part of the necessary network resistance may be placed into the lead between points 13 and 14. In order not to forego the above-mentioned advantages of the invention, however, the value of such a bridge resistance would have to be less than the sum of $r_1$ and $r_2$. In Fig. 1 a bridge resistor of this kind is shown at 15.

In Fig. 2 a choke coil 16 for speech-currents is connected in parallel to the winding 1 with the lowest possible direct-current resistance. In this case the direct-current resistance $r_1$ of the transformer winding 1 may be as high as desired and the direct-current resistance $r_2$ of the winding 2 may be practically zero $$\left(r_2=0;\ r_1=\frac{R_L\cdot a}{1+b}\right)$$

so that an ideal adaptation of the microphone and a correspondingly high total set efficiency is achieved.

In Fig. 3 the two arm ends 41 and 42 of the iron core 4, which are separated by the air gap 40, form also an equipolar pair of pole shoes of the permanent magnet 43. The resilient armature plate 44, which is connected to the other pole end of the permanent magnet by means of the piece of soft iron 45, is movable in air gap 40. By means of an alternating ringing current, passing through the auto-transformer from the exchange when the hook switch contacts 11, 12 are open, the armature is excited and transmits its oscillation via the clapper 46 to the bell (not shown) of the ringer. After the hand set has been picked up, the iron core 4 is premagnetiser by the microphone feed current so that the armature cannot be excited by the speech-currents but adheres to one side of the air gap. Instead of a ringer of this type, an ordinary ringer with a capacitor can, of course, be connected in parallel to the auto-transformer.

Figure 4:
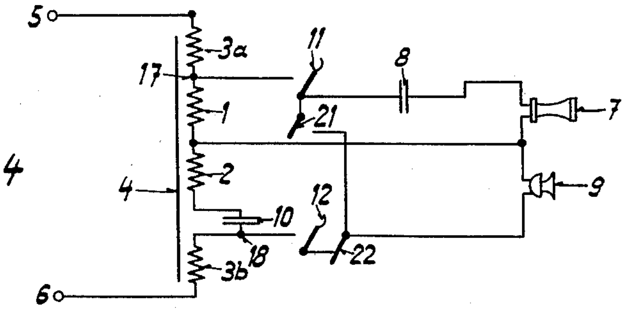
Figs. 4–9 show anti-interference dial sets.

In Fig. 4 and also in Figs. 5–9, which relate to telephone subscriber sets with a dial contactor for automatic exchanges, 21 designates the off-normal contact and 22 the pulse contact of the dial. In these embodiments, the previously mentioned winding 3 is divided into two outer windings 3*a* and 3*b*. When the number is dialled, a shorting circuit connection containing the pulse contact 22 is built up between the inner end points 17 and 18 of these outer windings of the off-normal contact 21.

Figure 5:
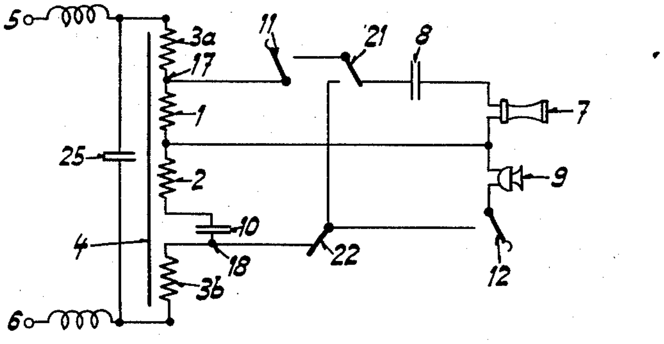

In Fig. 5 two high-frequency choke coils 23 and 24 are arranged between the two outer windings 3*a* and 3*b* and the respective line terminals 5 and 6 for further limiting the high-frequency interference voltages occurring when the number is dialled. The windings of the auto-transformer are bridged by an additional capacitor 25. This capacitor 25, however, may be replaced by the natural winding capacitance of the windings 3*a* and 3*b*, which may be artificially increased by a suitable type of winding.

Figure 6:
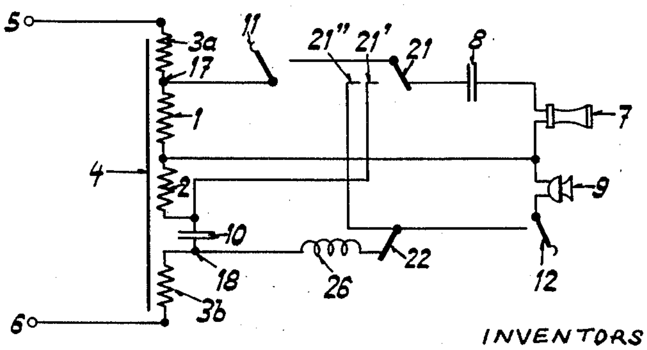

In Figs. 6–9 an additional high-frequency choke coil 26 is arranged in the shorting circuit built up between the points 17 and 18 by the off-normal contact 21 when dialling. Additional circuit elements are connected to the dial contactor by means of which a capacitive anti-interference circuit is built up between the inner end points 17 and 18 of the outer windings 3a and 3b before the shorting circuit is completed. In Fig. 6 this anti-interference circuit consists of the capacitor 10 connected in series with the winding 2. The additional circuit-elements of the dial contactor are combined with the off-normal contact 21 by designing the off-normal contact 21 as a double-sequence contact. When the number is dialled, the receiver 7 is first cut out by the primarily movable part 21 of the off-normal contact; then the capacitive anti-inteference circuit is built up by the contact of 21 with the secondarily movable part 21′, whereupon the shorting circuit 17—11—21—21′—21″—22—26—18 completed by the contact parts 21′ and 21″. The principal sources of interference, i. e. contacts 21 and 22, are thus made practically ineffective by the co-operation of the high-frequency choke 26 (series inductance) with the capacitive anti-interference circuit (parallel capacitance).

Figure 7:
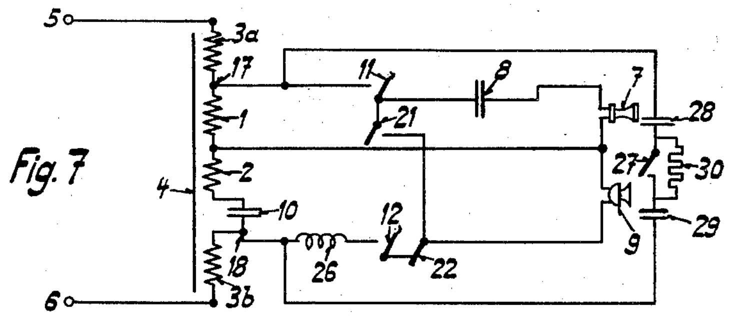
Figure 8:
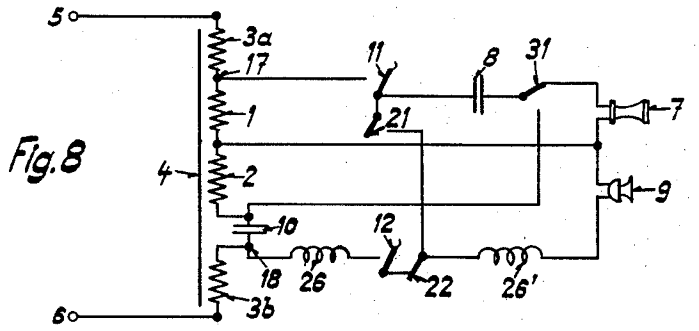
Figure 9:
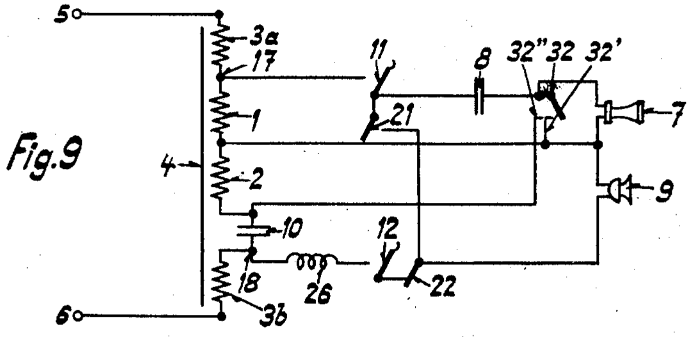

Figs. 7–9 relate to a further improvement in these anti-interference means. The dial contactor has a special set of springs with an operating contact which, when a number is dialled, operates at least 5 msecs. before the off-normal contact 21. According to Figs. 7–9 the capacitive anti-interference circuit comprises two series-connected capacitors between which the contact for completing this circuit is arranged, so that this contact is practically free of potential. In Fig. 7 two additional capacitors 28 and 29 are provided for this purpose. If the loss resistances of the two additional series-connected capacitors are substantially different from each other, the contact 27 may be bridged by a resistor 30 as indicated in Fig. 7. Resistor 30 must be of such a size that it has a high ohmic resistance in comparison with the impedance between the points 17 and 18 but a low ohmic resistance compared with the loss resistances of the two series-connected capacitors 28 and 29 of the anti-interference circuit.

In Figs. 8 and 9 the capacitive anti-interference circuit is formed by the two capacitors 8 and 10, instead of by two additional condensers (28 and 29 in Fig. 7). The capacitors 8 and 10 are connected in series with the receiver 7 and in series with the winding 2 of the auto-transformer respectively. In Fig. 8 the contact 31 of the dial contact operates at least 5 msecs. earlier than the off-normal contact 21 and cuts out the receiver 7 so that no crackling can arise during dialling. In order to prevent interefrence from being caused in the microphone circuit by equalising currents, a second high-frequency choke 26′ is arranged in series with the microphone 9. The choke windings 26 and 26′ may be arranged on the same core.

In the embodiment according to Fig. 9 the additional switching elements of the dial are designed as a double operating contact and consist of the primarily movable part 32, the secondarily movable part 32′ and the fixed part 32″. When a number is being dialled, the receiver 7 is shorted at 32′ to prevent crackle and the anti-interference circuit consisting of the series connection of capacitors 8 and 10 is closed at 32″, and the autotransformer winding 2 is shorted at 32′ and 32″ so that equalizing currents in the microphone circuit cannot set up any interference voltages. Only then is the off-normal contact 21 closed to close the short circuit between points 17 and 18 preparatory to the operation of the pulse contact 22 of the dial.

The individual elements of the various embodiments described in the foregoing can be combined with each other in other ways than specifically mentioned, according to particular local requirements.

We claim as our invention:

1. A telephone substation with side-tone reduction for central battery systems, comprising line terminals, an auto-transformer having at least three unidirectionally wound windings series-connected with one another, a receiver and a capacitor series-connected with each other across the intermediate one of said three windings in the operative condition of the substation, another capacitor series-connected with said three windings across said terminals and disposed electrically between one of said terminals and one of the two outer windings, a microphone connected parallel to the series connection of said other capacitor and said one outer winding in said operative condition, said one outer winding having a direct-current resistance of at least one-quarter of the value of the direct-current resistance of said intermediate winding and at most equal to said value, whereby said resistances of said latter two windings are together effective to substantially reduce side tone.

2. A telephone substation with side-tone reduction for central battery systems, comprising line terminals, hook switch means having two normally open contacts, a first capacitor, an autotransformer having at least three unidirectionally wound windings series connected with one another and connected in series with said first capacitor between said line terminals, a receiver and a second capacitor connected in series with one of said contacts across a first one of said windings, a microphone connected in series with said other contact across the series connection of said first capacitor and a second one of said windings, said second winding being immediately adjacent to said first winding and having a direct-current resistance of at least one-quarter of the value of the direct-current resistance of said first winding and at most equal to said value, whereby said resistances of said first and second windings are together effective to reduce side tone.

3. A telephone substation with side-tone reduction for central battery systems, comprising two line terminals, a first capacitor, an auto-transformer having four unidirectionally wound windings connected in series with one another and in series with said first capacitor across said terminals, a receiver and a second capacitor series-connected with each other across one of the two intermediate windings, a microphone connected across the series connection of said first capacitor with the other of said two intermediate windings, said other winding having a direct-current resistance of at least one-quarter of the direct-current resistance value of said one winding and at most equal to said value.

4. A telephone substation with side-tone reduction for central battery systems, comprising two line terminals, an autotransformer having four unidirectionally wound windings connected in series with one another across said terminals, a first capacitor serially interposed between three and the fourth of said windings, a microphone connected parallel to the series connection of said first capacitor and the adjacent one of said three windings, a receiver and a second capacitor series-connected with each other across the next adjacent one of said three windings, a dial contactor having a normally closed pulse contact and an off-normal contact, a shorting circuit extending between the respective inner end points of the two outer windings of said autotransformer and including said pulse contact and said off-normal contact in series relation to each other, said off-normal contact being normally open in said shorting circuit so as to complete said shorting circuit only during dialling, and said pulse contact, when closed, being series-interposed between said microphone and said first capacitor, whereby high-frequency interferences due to operation of said pulse contact are at least partly blocked from said terminals by the inductance of said outer windings.

5. A telephone substation according to claim 4, comprising high-frequency choke coils interposed between said terminals and said respective outer windings of said autotransformer.

6. A telephone substation according to claim 5, comprising additional capacitor means connected parallel to said autotransformer and attached to respective points between said choke coils and said respective outer windings.

7. A telephone substation according to claim 4, comprising high-frequency choke coils interposed between said terminals and said respective outer windings of said autotransformer, additional capacitor means connected parallel to said autotransformer and attached to respective points between said choke coils and said respective outer windings, and a high-frequency choke coil series-connected with said pulse contact in said shorting circuit.

JEAN MEYER DE STADELHOFEN.
JOSEPH MÜLLER-STROBEL.
JEAN PATRY.
RICHARD STRUB.

References Cited in the file of this patent

UNITED STATES PATENTS

| Number | Name | Date |
|---|---|---|
| 980,613 | Dean | Jan. 3, 1911 |
| 1,162,069 | Johnson | Nov. 30, 1915 |
| 1,452,277 | Johnson | Apr. 17, 1923 |
| 1,484,396 | Johnson | Feb. 19, 1924 |
| 1,689,598 | Pye | Oct. 30, 1928 |
| 1,732,135 | Mason | Oct. 15, 1929 |
| 1,896,196 | Green | Feb. 7, 1933 |
| 2,134,691 | Allenworth | Nov. 1, 1938 |
| 2,417,067 | Faralla | Mar. 11, 1947 |
| 2,452,239 | Huge | Oct. 26, 1948 |

FOREIGN PATENTS

| Number | Country | Date |
|---|---|---|
| 21,064 | Holland | Feb. 15, 1930 |
| 53,072 | Sweden | June 23, 1921 |
| 637,389 | Germany | Oct. 8, 1936 |